April 12, 1949.　　　　R. O. HEIN　　　　2,466,807
VIBRATION TESTING MACHINE

Filed Nov. 1, 1945　　　　　　　　　　3 Sheets-Sheet 1

Inventor
Robert O. Hein
by: Louis Sheldon
Atty.

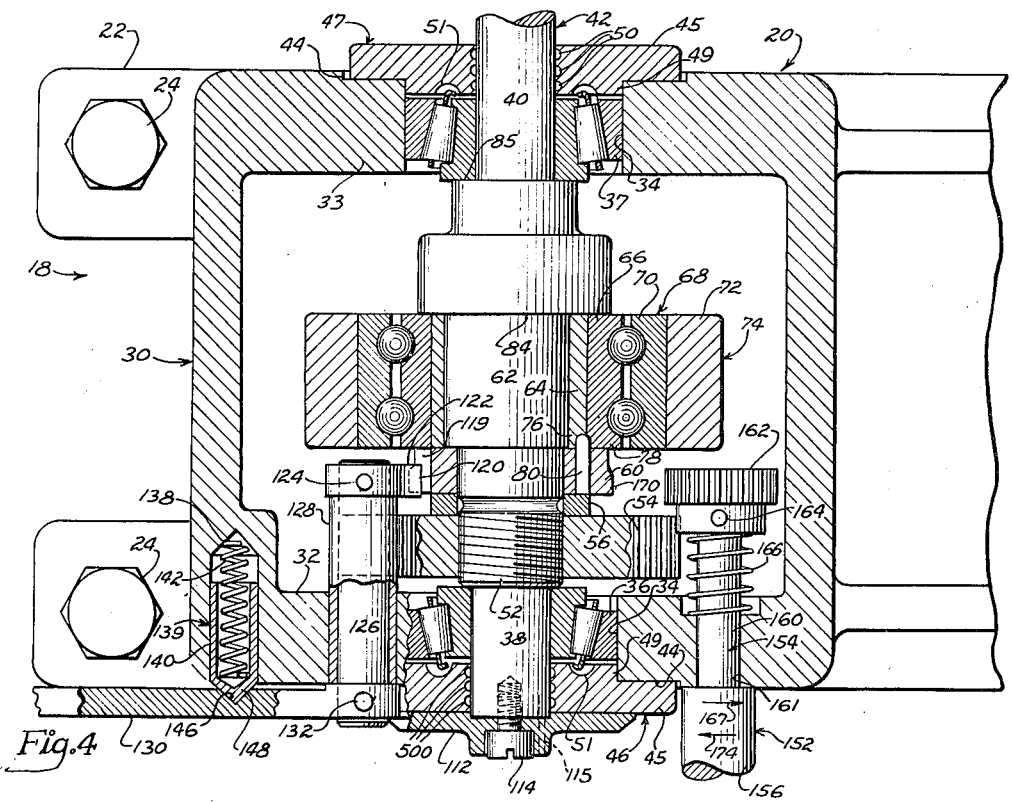

April 12, 1949.  R. O. HEIN  2,466,807
VIBRATION TESTING MACHINE
Filed Nov. 1, 1945  3 Sheets-Sheet 3

Inventor
Robert O. Hein
by Louis Sheldon
Atty.

Patented Apr. 12, 1949

2,466,807

UNITED STATES PATENT OFFICE 2,466,807

VIBRATION TESTING MACHINE

Robert O. Hein, Lincolnwood, Ill.

Application November 1, 1945, Serial No. 626,099

6 Claims. (Cl. 73—67)

This invention relates to the determination of fatigue of objects and materials due to vibration wherever encountered, as on aircraft and other power-operated devices, both mobile and stationary, and elsewhere, and to apparatus for reproducing vibratory conditions and subjecting test objects and materials thereto.

It is an object of my invention to provide a compact vibration testing machine which can be readily and conveniently adjusted substantially microscopically to operate at different displacements.

It is another object to provide such a machine so constructed that the displacement is adjustable in a few seconds from the outside of the machine.

It is also an object to provide a novel machine for subjecting test articles to vibration in simple harmonic motion.

Another object is to provide a novel vibration testing machine adapted to vibrate objects vertically.

Another object resides in plainly visible means for indicating the measure of vibration displacement.

A still further object is to provide means for simultaneously adjusting the displacement and indicating the measure of the adjusted displacement.

A further object is to provide a machine of the character referred to wherein the work support or table is maintained normal to the direction of vibration, while the support is vibrating, irrespective of displacement.

It is also an object to provide novel means for leveling the work table or support.

An additional object is to provide a novel work table to which the work is adapted to be readily and securely fastened.

Further objects and advantages of my invention will appear as the description proceeds.

The invention will be better understood upon reference to the following description and accompanying drawings, in which:

Fig. 3 is a plan view thereof.

Fig. 4 is an enlarged fragmentary sectional view taken as indicated by the line 4—4 in Fig. 1.

Figure 1:
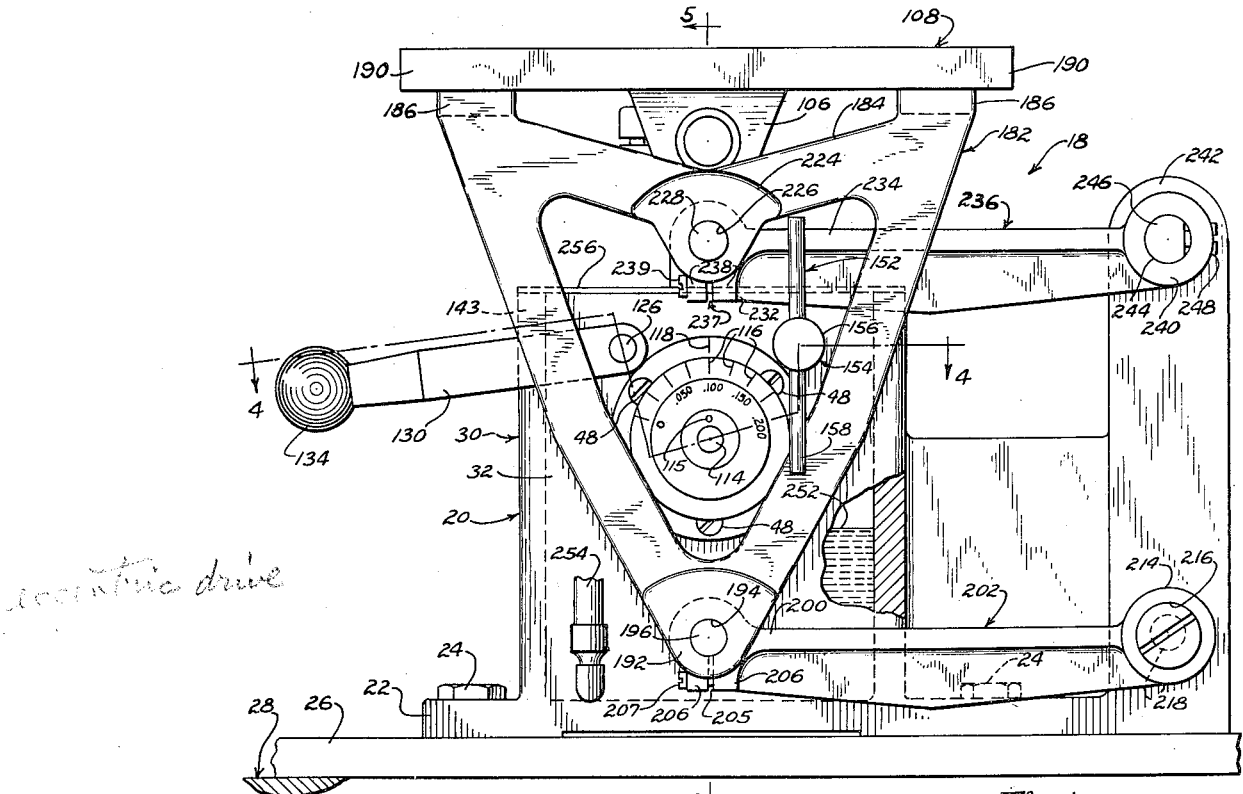
Fig. 1 is a front elevational view of one form of my invention.
Figure 2:
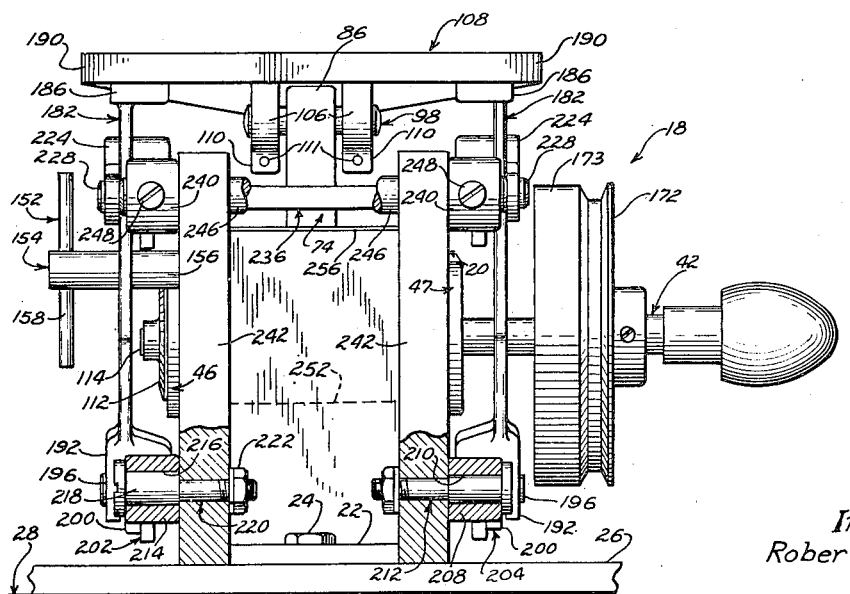
Fig. 2 is a right end elevation thereof.
Figure 5:
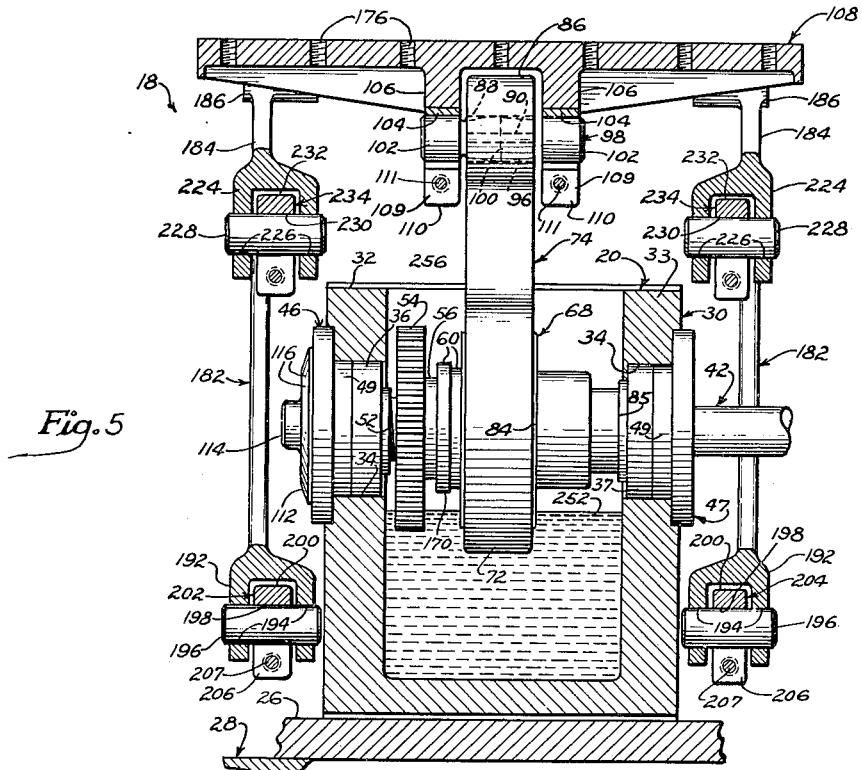
Fig. 5 is a vertical sectional view taken as indicated by the line 5—5 in Fig. 1.
Figure 6:
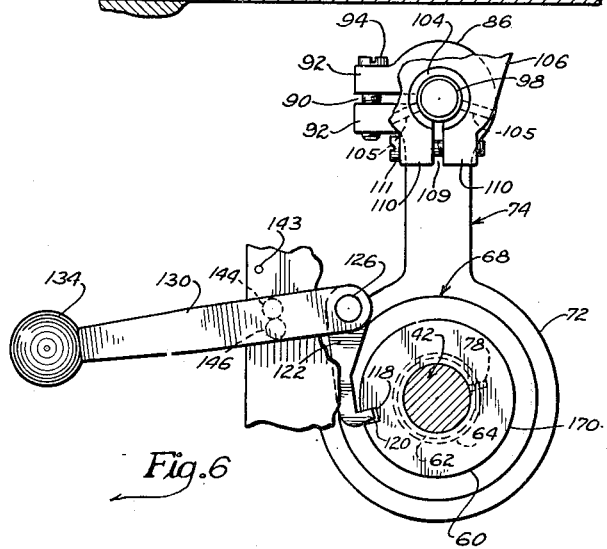
Fig. 6 is a fragmentary front elevational view of certain of the mechanism not elsewhere fully revealed.

Referring now more particularly to the drawings, I shall describe an embodiment of my apparatus for subjecting test objects to vertical vibration. It is indicated generally at 18, and comprises a body 20 having a base 22 with holes to receive fastenings 24 for attaching the body to a platform 26 adapted to be bolted or otherwise secured to a concrete structural steel or other suitable foundation generally indicated at 28. The body 20 has a housing 30, two opposite walls 32 and 33 of which have alined bores 34 in which bearings 36 and 37 are secured for receiving spaced portions 38 and 40 of a shaft 42. The walls 32 and 33 are counterbored as at 44 to receive the heads 45 of bearing retaining end plates 46 and 47, the heads being secured to the walls as by means of screws 48. The end plates include shoulders 49 disposed in the bores 34 adjacent the bearings 36 and 37 and have heat-resisting grease-containing grooves 50 for sealing against oil leakage and an inner end face groove 51 for receiving rotary parts of the bearings.

Adjacent the shaft portion 38, the shaft 42 has a preferably fine left hand threaded enlargement 52 about which is threaded a clamping gear nut 54. At the side of the gear 54 remote from the shaft portion 38 an anti-friction clamp washer 56 is rotatably mounted. The thickness of the gear 54 is less than the distance between the wall 32 or bearing 36 therein and the washer 56 so that the gear is capable of slight axial movement therebetween. The washer 56 is disposed between the gear 54 and a clamping collar 60 rotatably mounted on the shaft. The portion of the shaft on which the gear 54, washer 56 and collar 60 are mounted are coaxial with the shaft. The next portion 62 of the shaft is eccentric to the shaft axis, and an eccentric bushing 64 is slidably fitted thereabout and press-fitted within the inner race 66 of a ball-bearing 68, the outer race 70 of which is press-fitted within the driving end 72 of a connecting rod 74. The eccentric bushing 64 and the inner race 66 have registering slots or keyways 76 and 78 respectively, in which is disposed a key-pin 80 mounted in and projecting from the collar 60. Thus the eccentric bushing 64 and inner race 66 must turn with the collar 60. The eccentric bushing 64 and inner race 66 are disposed between the collar 60 and a shoulder 84 on the shaft, the shaft having another shoulder 85 engaging the bearing 37 carried in the rear wall 33 of the housing 30.

The connecting rod 74 extends upwardly from the driving end 72 thereof and its upper end 86 has a cylindrical bore 88 and is split or divided as at 90 to provide jaws 92 receiving an adjusting and clamping screw 94 whereby the intermediate portion 96 of a wrist pin 98 in the bore may be tightly clamped. The portion 96 of the wrist pin is crowned so as to be of maximum diameter at its center 100. The ends 102 of the wrist pin 98 are of the same diameter as the crown 100 and are received in split bushings 104 mounted as by means of pins 105 in lugs 106 depending from a work-supporting plate or table 108. Each lug 106 is likewise split as shown at 109, providing spaced jaws 110 receiving an adjusting and clamping screw 111 whereby the bushing 104 may be clamped about the respective wrist pin end 102. The purpose of crowning the wrist pin is to compensate for possible non-alignment of the connecting rod bore 88 with the table bushings 104.

It is now apparent that rotation of the shaft 42 will, by means of the eccentric bushing 64, reciprocate the connecting rod 74 and thus the table 108.

The displacement in this reciprocation is of course equal to twice the eccentricity of the exterior of the eccentric bushing 64 relative to the axis of the shaft 42. Inasmuch as the eccentric bushing 64 is rotatably adjustable about the eccentric portion 62 of the shaft, it follows that the eccentricity of the radially outermost part of the bushing can be varied between a maximum and, if desired, zero or any other selected minimum, depending also on the eccentricity of the portion 62 of the shaft.

A dial plate 112 is disposed adjacent the exposed face of the forward end plate 46 and is secured to the shaft 42 for rotation therewith as by a screw 114 and located in place as by a locating pin 115. The dial plate 112 has graduations 116, and the adjacent exposed face of the end plate 46 has a register mark 118 for cooperating with the graduations. The reading of the dial shows the length of the vibration stroke or displacement of the table 108 for any given adjustment. The means and manner of changing the displacement will appear as the description proceeds.

The locking collar 60 has an external notch 119 in which the tooth 120 of a locking pawl 122 is adapted to be received. The pawl 122 is part of a bell-crank lever and is secured as at 124 for rotation with a lock lever shaft 126 rotatable in a bushing 128 press-fitted or otherwise suitably mounted in the front wall 32 of the housing 30. A locking lever 130 is secured as at 132 to the shaft 126 outside of the housing wall 32 and preferably has a handle 134 in a convenient position for manual operation. Slidably fitted in a hole 138 in the forward portion of the housing 30 is a poppet detent 139 comprising a pin 140 between which and the bottom of the hole a coil spring 142 is disposed. After the spring 142 and detent pin 140 are positioned in the hole 138, the pin is pressed inward, compressing the spring, and the lever 130 is then secured to the shaft with the lever obstructing the detent pin. A stop pin 143 prevents the lever from rising high enough to permit escape of the poppet. The lever 130 has two spaced crater-like sockets or depressions 144 and 146 to selectively receive the preferably tapered end 148 of the poppet, the force of the spring being such as to preclude accidental movement of the lever when the poppet is in either of the sockets, the walls of each socket being capable of camming the poppet out of such socket upon exertion of sufficient turning force on the lever, permitting the poppet to snap into the other socket. When the poppet is in the socket 144, the pawl tooth 120 is out of the locking collar notch 119, and when the pawl tooth is in the notch, the poppet is in the socket 146. When the latter condition obtains, the locking collar 60 cannot turn, and hence neither can the eccentric bushing 64, with the result that if at such time the shaft 42 be turned, the eccentric portion 62 of the shaft will rotate relative to the eccentric bushing 64 and hence the eccentricity of bushing relative to the axis of the shaft modified, with consequent modification of the stroke or displacement of the connecting rod 74 and, with it, the table 108.

When the parts are properly assembled and connected for operation, the clamping gear nut 54 is screwed up tight against the washer 56 and the latter is thereby tightly held against the locking collar 60, so that the collar, eccentric bushing 64, the inner ball bearing race 66 and shaft 42 move as a unit, and thus rotation of the shaft imparts motion to the connecting rod 74. During such time, of course, the pawl tooth 120 is out of the notch 119. For the purpose of rotating the gear nut 54 conveniently from the outside of the housing 30, I provide a locking wrench 152 comprising a shaft 154 having an enlarged portion 156 with a handle 158 disposed in front of the housing and a reduced portion 160 rotatably fitted in a bore 161 in the housing wall 32, a pinion 162 secured as at 164 to the reduced portion, and a spring 166 under compression between the wall 32 and the pinion, constantly urging the wrench inward. When the machine is running, the pinion is in its innermost position out of mesh with the gear 54. When the machine is at rest and the handle 158 is pulled against the resistance of the spring 166, the pinion is moved into mesh with the gear 54. Now it will be apparent that when the pinion 162 is in mesh with the gear 54, and the wrench 152 is turned in the direction of the arrow 167, the gear will rotate and move axially in the direction to firmly clamp the washer 56 and collar 60. Then when the handle 158 is released the pinion 162 will be sprung to unmeshed position, and then the machine is in operative condition.

In order that the throw of the eccentric bushing 64 may be adjusted, the locking collar 60 must not only be locked by the pawl tooth 120 disposed in the recess 119 but also the collar must be unlocked from the shaft 42. The latter requires loosening of the gear nut 54. To lock the collar 60 against rotation, it is merely necessary, while the machine is stopped, for the operator to turn the locking lever 130 until the pawl tooth 120 touches the periphery 170 of the collar 60, while he manually turns a driven pulley 172, combined with a fly-wheel 173 if desired and fixed on the shaft 42 outside and at the rear of the housing 30, and at such time the poppet detent 139, pressing against the lower side of the tapered wall of the socket 144, exerts pressure on the lever so that the tooth 120 will move into the notch 118 when the notch is in register therewith. To then enable the shaft 42 to be turned relative to the collar 60, it is merely necessary, while the tooth 120 is in the notch 119, to pull the wrench 152 forward so as to mesh the pinion 162 with the gear 54 and turn the wrench in the direction of the arrow 174 to rotate the gear so that it will move axially forward and thus free of the washer 56. When now the wrench 152 is released it will again be sprung to its inoperative position. Now the shaft 42 may be rotated upon rotation of the pulley 172 by hand, while the eccentric bushing 64 is held stationary by the pawl tooth 120, to adjust the throw of the connecting rod 74 and hence the vibration displacement of the table 108.

The table 108 may have numerous tapped holes 176 for the reception of bolts or other fastening means to secure various test specimens thereto and is supported so as to be substantially horizontal at all times while at rest and during vibration. For the latter purpose I provide a stabilizer mechanism 178 comprising preferably generally isosceles triangular front and rear links 182, each having a side 184 uppermost, with the ends 186 of such side rigidly secured, as by screws 188, to corner portions 190 of the table 108, and an apex 192 lowermost, said apex being preferably in the form of a yoke with registering bores 194. A pivot pin 196 rotatably fitted in the bores of each yoke 192 extends through an intervening bore 198 in one end 200 of each of the two lower front and rear substantially horizontal links 202 and 204, respectively, said end being split as at 205 to provide spaced jaws 206 and having a clamping screw 207 to exert clamping pressure on the pin. The other end 208 of the link 204 has a bore 210 in which is rotatably received a pivot 212. The other end 214 of the other link 202 has a bore 216 in which is rotatably received an eccentric shoulder 218 formed on a pivot screw 220 adjustably anchored as at 222 to the body 20.

The upper side 184 of each triangular table-supporting link 182 has a yoke 224 midway thereof, with registering bores 226 in which a pivot pin 228 is rotatably fitted, said pin extending through an intervening bore 230 in one end 232 of each of one pair of front and rear arms 234 of an upper substantially horizontal generally H-shaped link 236, said end 232 being split as at 237, affording spaced jaws 238, and having a clamping screw 239 to provide clamping pressure on the pin. The other arms 240 of the H-shaped link 236 straddle front and rear upstanding ears 242 on the body 20, said arms and ears having registering bores 244 in which a pivot pin 246 is disposed, said pin being suitably held as by set screws 248.

When the table 108 is in neutral position, the plane of the axes of the upper pivot pins 228 and 246 is horizontal, as is also the plane of the axes of the lower pivot pins 196, 212 and 220. The distance between the axes of the upper pivot pins 228 and 246 should be the same as the distance between the axes of the lower pivot pins 196 on the one hand and 212 and 220 on the other. To compensate for inaccuracies in machining, the eccentric shoulder 218 is provided, said shoulder being rotatable to adjust the front link 182 rotatably about its upper pivot in order to level the table. Once the adjustment is made, the linkages positively hold the table level for all positions and irrespective of the vibration displacement of the table. The linkages control the path of movement of the table and hence of the pivot by which the upper end of the connecting rod 74 is connected to the table. This path is in the strictest sense an arc, but the length of the arc is so small compared to its radius that the arc may be regarded for all practical purposes as a straight line. With the arrangement described, the upper and lower links 202 and 204 are preferably horizontal when the table is in neutral position, so that each such link will swing slightly above and slightly below the horizontal during vibration. However, due to the fact that the table is horizontal and the triangular links are each pivoted to the upper and lower links, the level of the table must of necessity remain horizontal throughout the swinging movement of the upper and lower links. The maximum displacement may be selected as desired. For many purposes more than .200″ is unnecessary, and it is obvious that with a machine of this character in which the pivot arms swing on a radius of—say—six inches, the movement of the moving pivots, and hence of the table, must for all practical purposes be regarded as rectilinear and normal to the plane of the table.

The housing 30 preferably contains lubricating oil—substantially to the level indicated at 252, and is provided with a suitable oil gage 254 and a removable cover plate 256.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. A machine of the class described comprising a housing, a shaft supported by said housing, means for rotating said shaft, an outer cylindrical surface disposed eccentrically about the axis of said shaft in said housing, a bushing in said housing and engaging said surface and having an outer cylindrical surface disposed eccentrically to the axis of the interior of said bushing, a collar in said housing and about a cencentric part of said shaft and with which said bushing is rotatable, a lever pivoted to said housing and having an operating handle disposed outside of said housing and having a pawl inside of said housing, said collar and pawl having interlockable means, means for yieldably retaining said lever selectively in a position for which said pawl and collar are interlocked to prevent rotation of said collar, and in another position for which said pawl is released from said collar, whereupon said collar is free to turn, means in said housing for connecting said collar to said shaft for rotation therewith, and means independent of said lever and including a handle outside of said housing for rendering said connecting means selectively operative and inoperative, whereby, when said pawl and collar are interlocked and said connecting means is inoperative, said shaft, when turned by hand, will shift its eccentric surface rotatively relative to the bushing thereon, thus varying the eccentricity of the exterior surface of said bushing relative to said shaft axis.

2. A machine of the class described, comprising a housing having spaced walls, bearings in said walls, a shaft supported in said bearings, means outside of said housing for rotating said shaft, said shaft having an eccentric portion within said housing, an eccentric bushing in said housing about said eccentric portion, a collar about a concentric portion of said shaft within said housing, means coupling said bushing and shaft for rotation together, means including a handle outside said housing for selectively restraining and releasing said collar so that when said shaft is rotated by hand the eccentricity of said bushing relative to said shaft is adjusted, means for coupling said collar to said shaft for power rotation therewith when said collar is unrestrained, and means independent of the third-mentioned means and having a handle outside of said housing and operable to render the last mentioned coupling means selectively operative and inoperative.

3. A machine for vibrating a load, comprising a support, a table having means for attaching a load thereto, a connecting rod pivotally connected to said table, means carried by said support for reciprocating said connecting rod, legs depending from opposite sides of said table, each leg being connected to two corner portions of said table, upper and lower horizontal links pivoted to vertically alined parts of each leg and to substantially vertically alined parts of said support, one of said pivots being rotatably adjustable and having an eccentric shoulder disposed in one of said links to level said table and compensate for dimensional errors in machining of parts.

4. A machine for vibrating a load, comprising a support, a table having means for attaching a load thereto, a connecting rod pivotally connected to said table, means carried by said support for reciprocating said connecting rod, legs depending from opposite sides of said table, each leg being connected to two corner portions of said table, upper and lower horizontal links pivoted to vertically alined parts of each leg and to substantially vertically alined parts of said support, one of said pivots being rotatably adjustable and having an eccentric shoulder disposed in one of said links to level said table and compensate for dimensional errors in machining of parts, said support comprising a housing in which said reciprocating means is disposed, and means readily controlled from the outside of said housing for adjusting said reciprocating means to vary the vibratory displacement of said table.

5. A machine for vibrating a load, comprising a support, a table having means for attaching a load thereto, a connecting rod pivotally connected to said table, means carried by said support for reciprocating said connecting rod, legs depending from opposite sides of said table, each leg being connected to two corner portions of said table, upper and lower horizontal links pivoted to vertically alined parts of each leg and to substantially vertically alined parts of said support, one of said pivots being rotatably adjustable and having an eccentric shoulder disposed in one of said links to level said table and compensate for dimensional errors in machining of parts, said support comprising a housing in which said reciprocating means is disposed, means readily controlled from the outside of said housing for adjusting said reciprocating means to vary the vibratory displacement of said table, and means readily visible and located at the outside of said housing for indicating the amount of such displacement.

6. A machine of the class described comprising a housing, a shaft supported by said housing, means for rotating said shaft, an outer cylindrical surface disposed eccentrically about the axis of said shaft in said housing, a bushing in said housing and engaging said surface and having an outer cylindrical surface disposed eccentrically to the axis of the interior of said bushing, a collar in said housing and about a concentric part of said shaft and with which said bushing is rotatable, a lever pivoted relative to said housing and having an operating handle disposed outside of said housing and having a pawl inside of said housing, said collar and pawl having interlockable means, means for yieldably retaining said lever selectively in a position for which said collar and pawl are interlocked to prevent rotation of said collar, and in another position for which said pawl is released from said collar, whereupon said collar is free to turn, said retaining means being yieldable pursuant to manual force applied to said lever to turn said lever about its pivot, means for connecting said collar to said shaft for rotation therewith, and means independent of said lever and including a handle outside of said housing for rendering said connecting means selectively operative and inoperative, whereby, when said collar and pawl are interlocked and said connecting means is inoperative, said shaft, when turned by hand, will shift its eccentric surface rotatively relative to the bushing thereon, thus varying the eccentricity of the exterior surface of said bushing relative to the shaft axis.

ROBERT O. HEIN.

REFERENCES CITED

The following references are of record in the file of this patent:

UNITED STATES PATENTS

| Number | Name | Date |
| --- | --- | --- |
| 1,605,937 | Grieb | Nov. 9, 1926 |
| 2,277,643 | Holmes | Mar. 24, 1942 |
| 2,438,755 | Larsen | Mar. 30, 1948 |